Jan. 26, 1932. S. PAUL Re. 18,342
TIE ROD FASTENING
Original Filed May 21, 1926
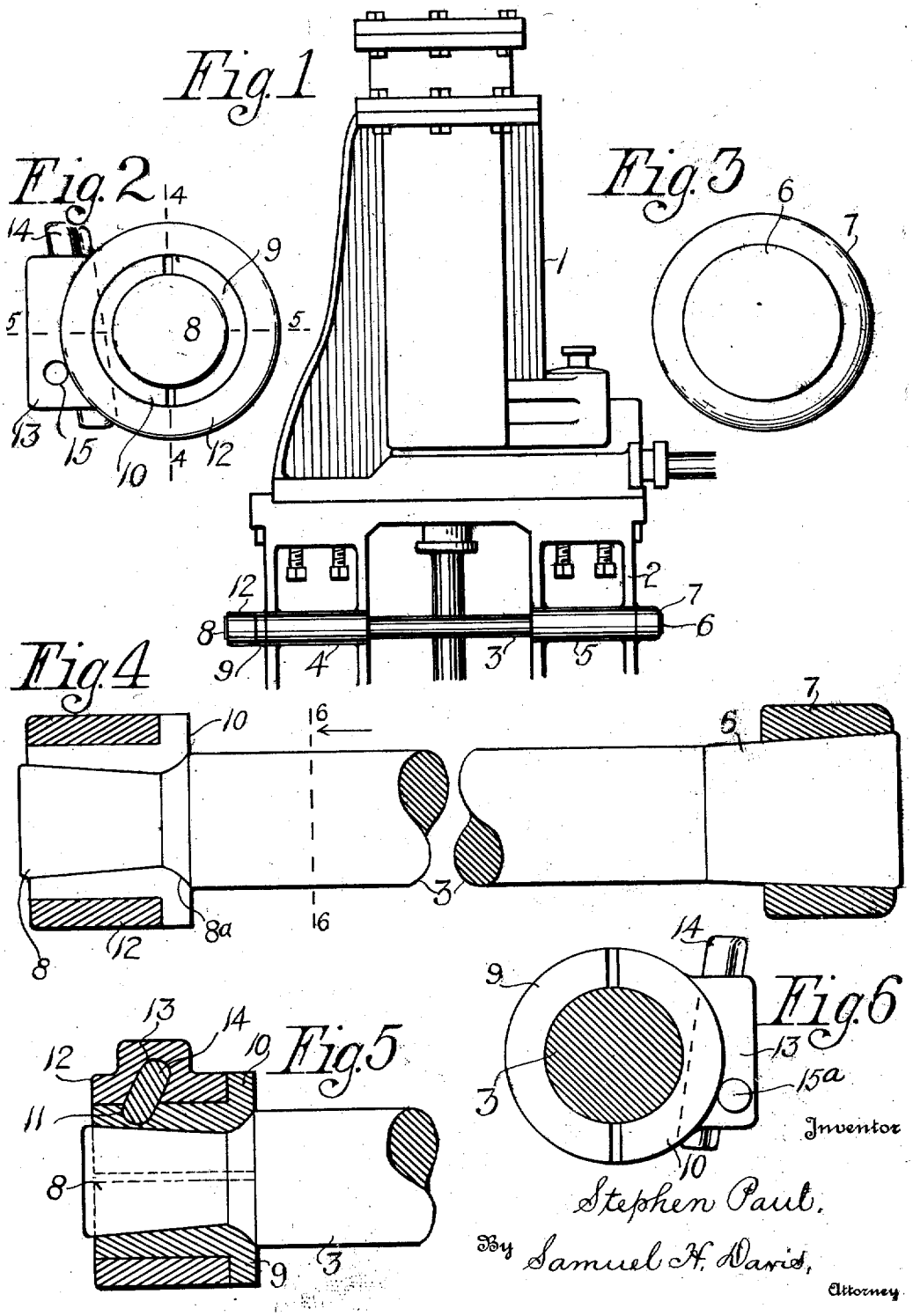

Reissued Jan. 26, 1932 Re. 18,342

UNITED STATES PATENT OFFICE

STEPHEN PAUL, OF LANSING, MICHIGAN, ASSIGNOR, BY DIRECT AND MESNE ASSIGNMENTS, TO PAUL THREADLESS BOLT COMPANY, OF LANSING, MICHIGAN, A CORPORATION OF MICHIGAN

TIE ROD FASTENING

Original No. 1,692,565, dated November 20, 1928, Serial No. 110,769, filed May 21, 1926. Application for reissue filed November 18, 1930. Serial No. 496,540.

This invention relates to tie rod fastenings and it belongs to that class of contrivances designed to secure the ends of rods against displacement when subjected to repeated strains, blows or jolts. While this invention may be employed as a fastening means for rods devoted to any kind of mechanical service, it is especially and advantageously adapted for use as a tie rod fastening for drop hammer frames, wherein the rods must withstand continual jarring movements when the hammer is operated.

The object of this invention is the production of a fastening of the character stated comprising parts of special formation and disposition including a rod having a tapering end, whereby it is believed a fastening particularly strong, easily made and long lasting is the result. Furthermore, in the assembly of the parts certain members may be suitably expanded by heat and upon cooling they will contract and cause frictional forces to be set up and thus additionally bind the parts together.

In the accompanying drawings the special construction and arrangement of the parts are illustrated, and Fig. 1 represents the front portion of the top of a power hammer with this invention applied thereto. Fig. 2 is a view of the left hand end, and Fig. 3 is a view of the right hand end of a rod bearing this invention, the scale of drawing being increased to enable the details of the construction to be more readily seen. Fig. 4 is a side view of a rod with this invention applied and shown partly in section. This view is taken on the vertical line 4—4 of Fig. 2. Fig. 5 is a view of the tapering end of the rod with this invention applied thereto and shown in horizontal section on the line 5—5 of Fig. 2. Fig. 6 is a cross section through the rod taken along the line 6—6 of Fig. 4 and shows a rear view of certain elements carried by the rod.

Throughout the description and drawings the same number is used to refer to the same part.

Considering the drawings, the power hammer 1 of any construction has the lower flanges 2 connected by the tie rods in any number such as the rod 3. The rod passes through the cylindrical hollow supports 4 and 5 with which the frame of the hammer is provided. The rod 3, as best shown in Fig. 4, has a tapering end 6 and a sleeve 7 fitted thereon, which cannot be displaced towards the right hand side. The other end 8 of the rod is also of tapering form and is of reduced diameter. The larger end of the tapering portions of the rod ends are at the terminations of the rod.

Surrounding the tapering and reduced end 8 are two members 9 and 10 constituting when assembled a sleeve which interiorly fits the reduced tapering end 8 of the rod 3 and the annular shoulder $8^a$ formed at the junction of the tapering end 8 with the body of the rod. It will be observed in Fig. 5 that the part 10 has a tangential groove 11.

Fitting the cylindrical exterior of the composite sleeve is an external sleeve 12 having on one side a passage 13 which may be brought to register with the groove 11 in the part 10 of the internal sleeve. The passage 13 and the groove 11 receive in binding relation a plug or wedge 14, and it is within the purview of this invention to provide a channel or bore 15 substantially parallel with the axis of the rod 3, and through which there may be driven a plug or cotter pin, shown in Fig. 6 and designated $15^a$, to fasten the wedge 14 in its place.

The operation of this invention is believed to be readily discernible from the drawings and the foregoing explanation. If the members 9 and 10 of the composite or inner sleeve be assembled on the reduced tapering end 8 of the rod, the external sleeve 12 may be slipped thereon and the passage 13 brought to register with the groove 11 as stated. If the parts are slightly expanded by heat the wedge when driven in is held against any ordinary displacing effect, but, if so desired, a pin may be passed through the bore 15.

Having now described this invention and explained the manner of its operation, what I claim is:

1. In a rod fastening, the combination with a rod having an end tapering in form, the larger end of the tapering portion being at the termination of the rod, of a sleeve composed of separable parts constructed to fit the tapering end of the rod, the assembled parts of the said sleeve having a cylindrical exterior, one of the parts of the said sleeve having a tangential groove, an external sleeve fitting the cylindrical exterior of the composite sleeve, said external sleeve having a passage extending through one side and adapted to be brought to register with the groove in said part of the composite sleeve, and a wedge passing through said passage and engaging the said groove to lock the sleeves on the tapering end of the rod.

2. In a rod fastening, the combination with a rod having an end tapering in form, the larger end of the tapering portion beginning at the termination of the rod, of a sleeve composed of separable parts, the junction of the said tapering end and the body of the rod forming an annular shoulder, the said parts of the sleeve being constructed to fit when assembled the tapering end of the rod and the said shoulder, the said assembled parts of the sleeve having a cylindrical exterior, one of the parts of the said composite sleeve having a tangential groove, an external sleeve fitting the cylindrical exterior of the composite sleeve, the said external sleeve having a passage extending through one side and adapted to be brought to register with the groove in said part of the said composite sleeve, and a wedge passing through the said passage and engaging the groove to lock said sleeve on the tapering end of the rod.

3. In combination with a tapering rod end, the tapering portion being largest at the end of the rod, a composite sleeve having a grooved part, an external sleeve provided with a passage registering with the said groove, a locking member engaging the said passage and groove, and means for retaining the said member in place.

4. In a rod fastening, the combination with a rod having an end of reduced diameter tapering in form, the larger end of the tapering portion being at the termination of the rod, of a sleeve composed of separable parts constructed to fit the reduced end of the rod when assembled, the assembled parts of the said sleeve having a cylindrical exterior, one of the parts of the said sleeve having a tangential groove, an external sleeve fitting the cylindrical exterior of the said composite sleeve, the said external sleeve having a passage extending through it on one side and adapted to be brought to register with the said groove, and a wedge passing through the said passage and engaging the said groove to lock the sleeves on the said reduced end of the rod.

5. A fastening device which comprises a rod having a tapered portion adjacent one end, said portion being largest toward the end of said rod, a split sleeve having a corresponding interior taper adapted to cooperate with said tapered portion, said sleeve having its interior and exterior surfaces smooth and free from threads, an external member adapted to surround said split sleeve, and means for preventing relative longitudinal movement between said sleeve and member, said split sleeve being held by said rod and said external member against substantial movement in either direction along said rod.

6. In a device of the class described a rod having a tapered portion adjacent one end, said portion being largest toward said end, a threadless split sleeve having an interior tapered surface adapted to fit over said tapered portion, an external member adapted to surround said split sleeve, and separate means adapted to be applied subsequent to positioning of said external member for positively holding said sleeve and member against relative movement.

7. In a device of the class described a rod having a tapered portion at each end, said portions being largest toward the ends of the rod, the tapered portion at one end at its smallest point being larger in cross-section than the tapered portion at the other end at its largest point, sleeves having tapered interior surfaces adapted to cooperate with said tapered portions, the sleeve cooperating with the smaller tapered portion being split, an external member adapted to fit over said split sleeve and means for securing said split sleeve and external member together.

8. A fastening device which comprises a rod having a tapered portion adjacent one end, said portion being largest toward the end of said rod, a split sleeve having a corresponding interior taper adapted to cooperate with said tapered portion, said split sleeve being free from external and internal threads and adapted to be applied from the outer end of said rod, an external member adapted to be placed around said split sleeve after the latter has been positioned, and means for preventing relative longitudinal movement between said sleeve and member.

In testimony whereof I have signed my name to this specification this 13th day of November, 1930.

STEPHEN PAUL.